Dec. 9, 1958   S. PARDEE, JR   2,864,044
SERVO SYSTEM DIRECTIONAL BEARING CONVERTER
Filed Jan. 11, 1956   2 Sheets-Sheet 1

SUMMED VOLTAGE AT NETWORK 18 OUTPUT FOR CW DRIVE.

RELAY CIRCUIT OUTPUT AT JUNCTION OF RESISTORS 37 AND 38.

COMPOSITE VOLTAGE AT JUNCTION OF RESISTORS 25 AND 39.

INVENTOR.
SCHUYLER PARDEE, JR.
BY
ATTYS.

Dec. 9, 1958     S. PARDEE, JR     2,864,044
SERVO SYSTEM DIRECTIONAL BEARING CONVERTER
Filed Jan. 11, 1956     2 Sheets-Sheet 2

INVENTOR.
SCHUYLER PARDEE, JR.
BY
ATTYS.

United States Patent Office 2,864,044
Patented Dec. 9, 1958

2,864,044

SERVO SYSTEM DIRECTIONAL BEARING CONVERTER

Schuyler Pardee, Jr., New Vernon, N. J., assignor, by mesne assignments, to the United States of America as represented by the Secretary of the Navy Application January 11, 1956, Serial No. 558,601

10 Claims. (Cl. 318—28)

This invention relates to a directional bearing converter system and more particularly to an electro-mechanical system for driving a rotatable element over the shorter rotative path in the 360 degree field to positions corresponding to direct current voltage signals to be converted to mechanical directional movement.

Systems are known where the rotational direction and number of turns of a motor are controlled in accordance with an electrical signal response of out-of-phase or unbalanced frequency or potentials but these systems are designed to operate in only one direction for one polarity or sense of driving signal regardless of the existence of a shorter path to the desired value. That is, the system is incapable of modifying its input data automatically so as to follow discontinuous input signals in a continuous manner, or to prefer an economical direction of operation to an uneconomical direction.

In the present invention a converter system is provided to convert direct current electrical signals responsive of information, herein illustrated as for directional information, into mechanical movement displaying that direction. One means of accomplishing this to to correlate direct current (D. C.) voltage levels with directional degrees to represent the information to be communicated. Since one complete revolution in degrees is 360, the degrees must drop from 360 to 0, or rise vice versa, to continue the revolving movement, and consequently the corresponding voltages must likewise change from the D. C. potential representative of 360 degrees to the D. C. potential representative of zero degrees, and vice versa, at this crossover point. The system must accomplish the control of the mechanical movement displaying the information to pass over this crossover point whenever necessary to display the proper information. The system must also accomplish the ability of the mechanical movement to always use the shorter rotative path utilizing either rotative direction to arrive at the proper informational position without hesitation. A circuit means is provided which senses the voltage relation of the mechanical display element and any new signal to polarize a winding of a motor in the proper sense to drive the display over the shorter rotative path. This circuit includes means to prevent interruption of the driving motor wherever the display is passing over the crossover point in either direction. In one practical illustration as given herein, target information can be directionally displayed using D. C. voltage signals, which display will always seek the new target directions over the shorter rotative path to provide rapid indications of target signal changes. It is therefore a general object of this invention to provide a directional bearing converter system that will cause a mechanical element to drive over the shorter rotative path in a circular field of 360 degrees in either rotative direction to any rotative position representative of a D. C. signal direction.

These and other objects, advantages, features, and uses will become more apparent as the description proceeds when taken in view of the accompanying drawings in which.

Figure 1:
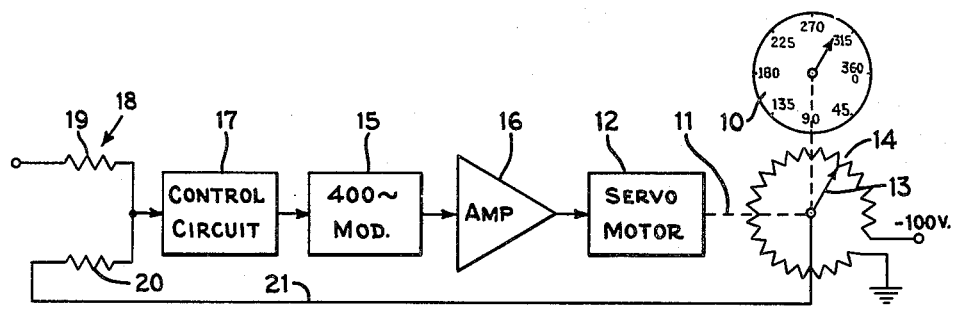
Fig. 1 is a schematic diagram, partly in block, of the invention.
Figure 2:
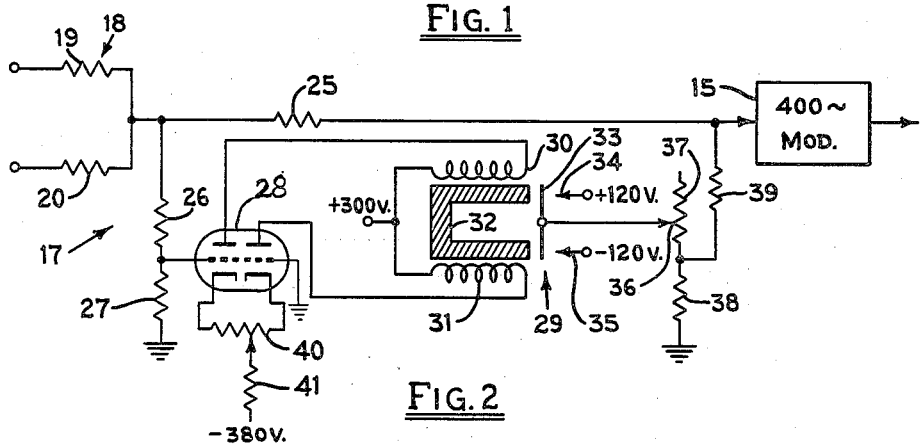
Fig. 2 is one embodiment of a circuit diagram for carrying out the invention.

Referring more particularly to Fig. 1, an indicator 10 displaying direction, as target direction or the like, is connected to the rotor shaft 11 of a servo motor 12 for driving the indicator. The shaft 11 also drives the movable tap 13 of a rotatable potentiometer 14 which is connected across a D. C. potenital of some fixed and known value herein shown as —100 volts for the purpose of illustration. The servo motor 12 is powered from a voltage source as, for example, a 400 cycle source 15 through an amplifier 16. The 400 cycle power source is modulated by a D. C. voltage coming from a control circuit 17, one embodiment of which is shown in Fig. 2 and soon to be described, to control the direction and degree of rotation of the servo motor 12. The control circuit is fed from the output of a summing circuit 18 consisting of a pair of similar resistors 19 and 20 joined at their output. The resistor 19 has a terminal for receiving periodic or random D. C. voltage signals which are correlated to direction in degrees to be indicated at 10. The D. C. voltage signals may, for example, come from a radar device and range, for example, from 0 to 100 volts positive. For such an example in describing this invention volts correspond in the ratio of 1 volt for 3.6 degrees in direction wherein it is desirable to have the indicator to display the direction of a target from the signal of a radar or other directional sensing device. The resistor 20 is coupled to the movable tap 13 of the potentiometer 14 via sonductor 21 so that the control circuit will be able to follow the rotative movements of the servo motor and the indicator and to control the servo motor accordingly, as will soon be described. Whenever the output of the control circuit 17 is positive it will modulate the power source 15 to cause servo motor operation in one rotative direction and when the circuit output 17 is negative the servo motor will be driven in the other rotative direction, as will be more fully explained in the following description.

Referring now more particularly to Fig. 2, where like reference characters refer to like parts, one embodiment of a control circuit is shown wherein the output of the summing network 18 is connected to the servo motor modulator 15 through a resistor 25, which also is part of a summing network with resistor 39. The summing network 18 output is also coupled through resistors 26 and 27 to ground. The junction of resistors 26, 27 is connected to the grid of one section of a double triode tube 28, the grid of the other section being connected directly to ground. The anodes of the tube 28 are each coupled through an energizing coil of a double throw relay, generally referred to by reference character 29, to a positive potential, the anode of the left section being coupled through the coil 30 and the anode of the right section being coupled through the coil 31. In practical constructions the coil might be wound on opposite legs of a core member 32 which core member legs are in inductive relation with a centrally pivoted switch blade 33. The switch blade is adapted to contact either of two contacts 34 or 35 to couple a positive or negative potential, respectively, to the center movable tap 36 of a variable resistor 37. The variable resistor 37 is coupled through a resistor 38 to ground. The junction of the resistors 37 and 38 is coupled through summing resistor 39 to the output side of the resistor 25. The two cathodes of the tube 28 are coupled to opposite ends of a potentiometer 40 the movable tap of which is coupled to a negative voltage source through resistor 41.

The resistors 26 and 27 are of such pre-calculated value, and the conduction of the two halves of tube 28 is so adjusted by resistor 41 and balanced by potentiometer 40, that when the summed voltage from the summing network 18 is in the range of +50 volts to +25 volts, the left section of tube 28 will become conductive; when the summed voltage is in the range +25 volts to −25 volts, the tube, and consequently the relay 29, is in equilibrium; and when the summed voltage is in the range −25 volts to −50 volts the right section of the tube 28 becomes conductive. In actual practice the tube is activated at voltages slightly off of +25 and −25 volts, summed voltage, to avoid dead center positions of the servo motor at 180 degree differences between the signal and indicator as will be more fully described below.

The contact 34 is coupled to a positive potential and the contact 35 is coupled to a negative potential, each being in the magnitude of 120 volts for the purpose of illustration which is adjusted by the variable resistance 36, 37 to bring the magnitude of this voltage to 50 volts at the juncture of resistances 37 and 38. Whichever voltage source is connected through the relay will place a potential of 25 volts, positive or negative as the case may be, at the juncture of resistances 25 and 39. All voltages described and shown are chosen for illustrating the invention and may be changed, where desirable or feasible.

In the operation of the device, reference is made to Figs. 1 and 2 with occasional reference to Figs. 3 through 6. Let it be assumed, for the purpose of this example, that the indicator 10 is resting at 288 degrees which produces −80 volts on the movable tap 13 of potentiometer 14. Let it be further assumed that a voltage signal of +20 volts has been impressed on the resistor 19 which produces a summed voltage of −30 volts, or $$\frac{+20-80}{2}=-30$$

at the output of the summing network 18. This summed voltage being in the range of −25 to −50 volts will cause the right section of the tube 28 to conduct energizing the coil 31 to switch the switch blade 33 in contact with the positive voltage. This positive voltage places a +50 volts in addition with the −30 volts through the resistors 39 and 25, respectively, resulting, when summed, in +10 volts to be passed on to the voltage source modulator circuit of the servo motor 12. Whenever the resulting voltage is positive, the servo motor will rotate in a direction to rotate the needle of the indicator 10 clockwise; and whenever the resulting voltage is negative, the needle will be driven counter-clockwise. In the above example, the needle of indicator 10, generally referred to herein as the card, will drive clockwise to the point where the card will rest at signal voltage, but opposite in sign, or at −20 volts on the potentiometer tap 13. As the card is driven toward 360 degrees whereupon the potentiometer tap 13 passes over the "crossover" point to 0 volts (zero degrees), the input summed voltage immediately becomes +10 volts and the relay 29 drops into equilibrium since neither section of tube 28 conducts in the summed voltage range of +25 volts to −25 volts, as hereinbefore stated. The resulting voltage to the unit 15 still being positive the servo motor 12 continues to drive the card 10 clockwise. When the potentiometer tap 13 reaches −20 volts the summed voltage will be zero and the servo motor 12 will stop.

Figure 4:
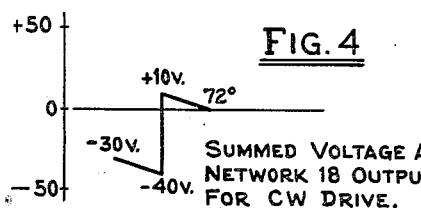
Fig. 4 is a graphical illustration of the unmodified summed voltage for the shorter path shown in Fig. 3.
Figure 5:
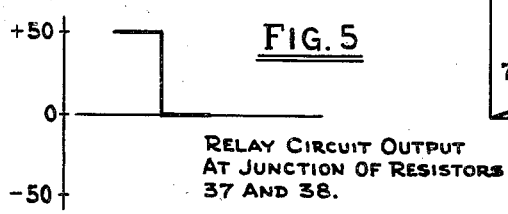
Fig. 5 is a graphical illustration of the relay output in the circuit of Fig. 2 for the example.
Figure 3:
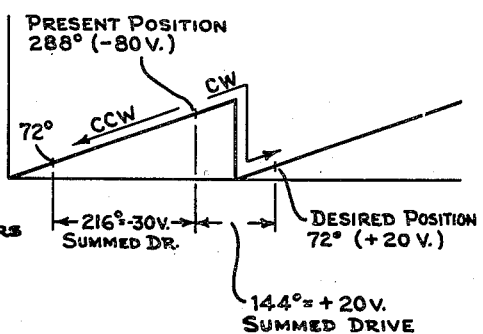
Fig. 3 is a graphical illustration of an example of summed drive comparisons in both rotative directions of a rotatable member.
Figure 6:
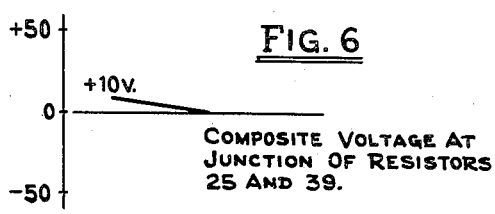
Fig. 6 is a graphical illustration of the composite voltage driving the rotatable element in the example.

The above example is graphically shown in Fig. 3 where the signal and indicator or card positions are illustrated. In the clockwise direction the card would only have to be driven 144 degrees to arrives at the new position, whereas in the counter-clockwise direction it would have to be driven 216 degrees. The circuitry of this invention insures the drive in the shorter rotative direction. In Fig. 4 the summed voltage at the output of network 18 is shown as it proceeded in the above example with the summed voltage changed at the "crossover" point. Fig. 5 illustrates the relay 29 output showing that at the "crossover" point the relay output fell to and remained at zero. In Fig. 6 the voltages of Figs. 4 and 5, summed by resistors 25 and 39, or composite voltage, is shown for the above example in which is started at +10 to drive the servo motor clockwise ending at zero voltage when the card reached the 72 degree position (−20 volts on the potentiometer 13, 14).

The same operation takes place whenever there is a sufficient difference in voltage magnitude between the card potentiometer and the signal voltage. It may be understood by now that the significance of the summed voltage of 25 volts represents the difference of 180 degrees between signal and card; that is, the greatest summed voltage possible is 50 volts, plus or minus, representative of +100 volts for the signal (360 degrees) or −100 volts for the card (360 degrees) or $$\frac{100}{2}=50$$

and that 50 volts represents 180 degrees, which when summed is 25 volts. Whenever the summed voltage of ±25 volts is exceeded, the tube 28 is activated in the appropriate section to drive the card over the shorter rotative path. As hereinbefore stated the resistors 26, 27 and the biasing of tube 28 are pre-arranged to avoid an exact 25 volt dead centering so that no hunting will occur when the signal and card are exactly 180 degrees apart. This hunting can be eliminated by isolation between input and output summing networks.

Taking another example to disclose counter-clockwise operation of the card, let it be assumed that the signal voltage is +35 (126 degrees) and that the card is resting, as before, at 288 degrees (−80 volts). The summed voltage would be $$\frac{+35-80}{2}=-22\frac{1}{2} \text{ volts}$$

at the output of the summing network 18. The tube 28 would not be activated and consequently the relay 29 would remain in equilibirum leaving the composite voltage at −11¼ volts as summed by resistors 25 and 39 to cause drive of the servo motor to drive the pointer of indicator 10 in a counter-clockwise direction until the card rests at 126 degrees. The counter-clockwise drive in this example is only 162 degrees while the clockwise drive would have been 198 degrees.

From the above examples it is believed to be clear that the pointer or card on the indicator 10 will always proceed to new signal directional positions over the shorter rotative path and over the "crossover" point without interruption or hunting.

Figure 7:
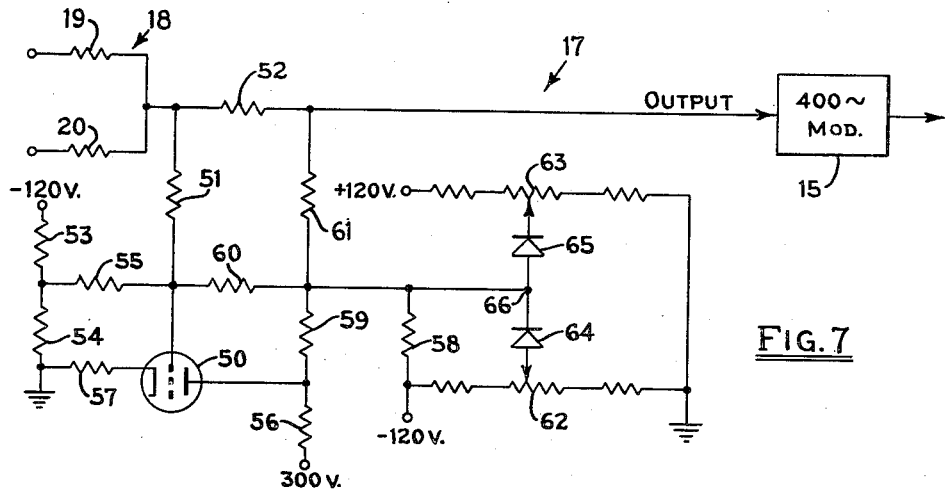
Fig. 7 is another embodiment of the circuit of Fig. 2.

Referring now more particularly to Fig. 7, wherein like parts in other views are represented by like reference characters, there is shown a schematic control circuit diagram involving no relays which is another embodiment of the control circuitry in Fig. 1. The summed output of the summing circuit 18 is applied to the grid of a triode amplifier tube 50 through a resistor 51 and directly to the circuit output through the resistor 52. The resistors 53 and 54 provide a negative bias coupled to the grid of tube 50 through the resistor 55. The resistor 56 is an anode load resistor for the tube 50 and a cathode resistor 57 is coupled between cathode and ground. The direct current (D. C.) voltage level of the tube 50 anode is reduced to approximately zero at the junction of resistors 58 and 59, for example, by positive and negative voltage sources. A feed-back from anode to grid is through the resistor 60 to control the gain of the amplifier tube 50. The resistor 61 couples the output of the amplifier tube 50 to the output of the circuit by joining the output side of the resistor 52. Thus resistors 52 and 61 sum the outputs of the amplifier and of network 18.

A clamping circuit has a potentiometer 62 connected between a negative voltage source and ground and a potentiometer 63 connected between a positive voltage source and ground. The movable tap of each potentiometer is coupled through a germanium varistor or diode 64 and 65, respectively, to a common point 66 which is directly coupled to the junction of the resistors 58, 59, 60, and 61. The diodes 64 and 65 are oriented to limit or clamp the positive and negative voltages at predetermined amounts at the point 66. The cut-off bias of these diodes may be adjusted by the potentiometers 62 and 63. Whenever the potential at 66, which is the output signal voltage of the amplifier tube 50, reaches the bias value, one or the other of the diodes will conduct to limit or clamp the voltage at this level, the diode being conductive depending on the polarity of the signal voltage.

Figure 8:
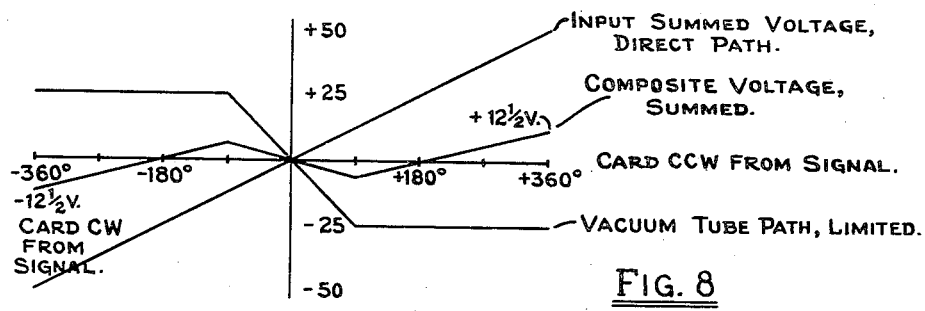
Fig. 8 is a graphic illustration of the output voltages in an example of Fig. 7.

It may be realized from the above description that the circuit of Fig. 7 has two paths from the summing circuit input to the output, the direct path through the resistor 52 and the vacuum tube path. Fig. 8 is a diagrammatic illustration of the summed voltage, the voltage resulting in the vacuum tube path, and the composite voltage resulting from the first two voltages summed at the juncture of resistors 52 and 61 to produce the output voltage. Figs. 7 and 8 may be referred to in the following description of operation of the device. The several resistors and potentiometers in the Fig. 7 embodiment are chosen and preset such that a summed voltage of 12½ volts, plus or minus, representative of 90 degrees, will cause the potential at the point 66 to reach the bias value herein shown set at 25 volts on one of the diodes 64 or 65, depending on signal polarity, causing conduction through that diode to limit the voltage through the vacuum tube path, as shown in Fig. 8. This voltage established by the tube 50 and the diode 64 or 65 when summed with the summed voltage through the resistors 61 and 52 provide a composite voltage operative through the output to control the servo motor 12. It is to be understood that the output of the amplifier tube 50 provides an inverted signal of approximately twice the amplitude of the error signal fed to it from the summing circuit 18 as graphically shown in Fig. 8. When the summed error voltage from the circuit 18 is in correspondence or out of correspondence representative to not more than 90 degrees, the inverted signal from the vacuum tube 50 path predominates at the output causing a negative slope of signal versus error in this region. For signal errors between the correct direction and indicator 10 direction greater than approximately 90 degrees, the output of tube 50 is limited by the diodes 64 and 65 causing the composite voltage to reverse slope and slope in the same direction as the voltage of the direct path summed signal through the resistor 52. The composite or output voltage will thus pass through zero at plus or minus 180 degrees. The potentiometers 62 and 63 may be set to cause this condition, since hunting of the type discussed for the embodiment disclosed in Fig. 2 does not occur with the embodiment of Fig. 7.

Figure 9:
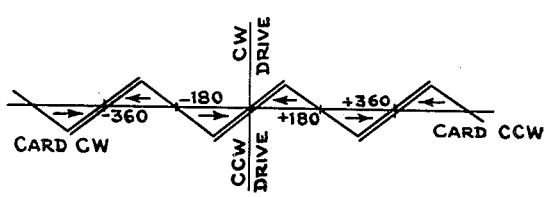
Fig. 9 is a graphical illustration of drive relations produced by the circuit of Fig. 7.

Fig. 9 is a diagrammatic illustration showing the directions of drive of the card 10, and shows that, because of the inversion in the vacuum tube path, the drive will be away from zero degrees and towards either one of the 180 degree points. Fig. 9 also shows that the voltage corresponding to 360 degrees is large and the voltage corresponding to zero degrees is zero, so that the transition cannot be smooth.

Figure 10:
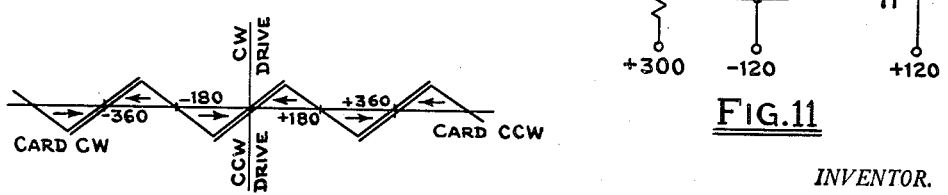
Fig. 10 is a graphical illustration of drive relations produced by the circuit of Fig. 7 after adaptation of the display element.

Since the potentiometer tap 13 is positioned at one of the 180 degree points for an error signal from network 18 of zero volts, card 10 is repositioned on shaft 11 to read zero degrees for this condition. Fig. 10 shows this new orientation of error signal versus card reading, and also shows that there is now an output voltage of zero for a card error of both zero degrees and 360 degrees. The transition between the two points, or "crossover" will therefore be smooth.

For the purpose of example let it be assumed that the summed voltage of the error signal from 18 is +10 volts. The output of amplifier 50 will then be approximately −20 volts producing a composite voltage, summed, of −5 volts at the output of the control circuit to the modulator 15. Since the +10 summed voltage indicates that the indicator 10, repositioned 180 degrees as indicated above, is leading the new directional signal by 180 degrees less 72 degrees, or 108 degrees, the card should be driven counter-clockwise to bring the card into coincidence with the new direction established by the new voltage signal. The negative composite voltage will cause the servo motor 12 to drive the indicator 10 to the new position as indicated by Fig. 10. The potentiometer tap 13 will come to rest 180 degrees (50 volts) away from the input signal direction. A similar example may be followed on Fig. 8 for a negative summed voltage under 12½ volts in which the vacuum tube output would be positive and the composite voltage would be positive to cause the servo motor 12 to drive the card clockwise. In the last example the negative voltage indicates that the card is ahead of the new signal by more than 180 degrees.

For another example, let it be assumed that the summed voltage from 18 is +30 volts. The tube 50 output would normally be −60 volts but the diode 64 is operative to limit the voltage to −25 volts which in the summation resistors 61 and 52 provides a composite voltage of approximately +2½ volts. The positive composite or output voltage causes the servo motor 12 to drive the card 10 clockwise to the new signal position. Likewise, a negative summed voltage, for example −30 volts, will produce approximately −2½ volts as the composite or output voltage to produce counter-clockwise rotation of the card of indicator 10.

Fig. 10 illustrates the directional rotation of the indicator 10 for all error signals. From Figs. 8 and 10 it may be seen that the servo will always drive in either direction over the "crossover" point from zero degrees to 360 degrees, or 360 degrees to zero degrees, and that the proper directional selections will be made when the card and new signals 180 degrees apart. In addition, normal operation of the system (with zero error) is with vacuum tube output limited by a diode, so that vacuum tube drift will not cause error.

Figure 11:
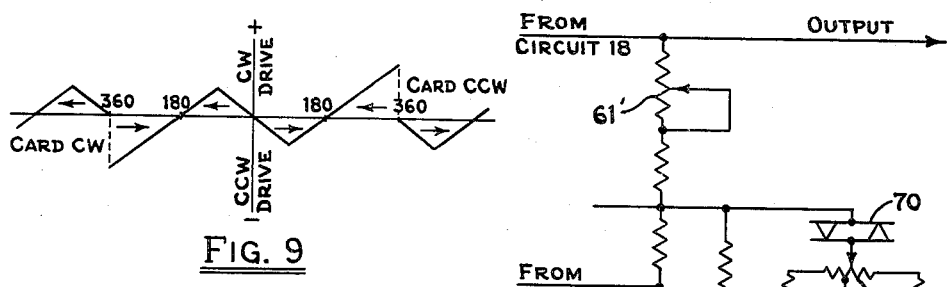
Fig. 11 is a modification of the circuit shown in Fig. 7.

Fig. 11 presents a modification of the control circuit shown in Fig. 7 showing a modification of certain elements of Fig. 7 by primed reference characters. In this modification a varistor 70 limits or clamps the voltage in both directions and proper values of associated resistors will insure that voltages are limited or clamped at the correct level. The varistor 70 used should be reasonably well balanced for current flow in both directions. A biasing potentiometer 71 will then allow the crossover points of the output voltage to be set to zero for an average value of plus or minus 50 volts error signal thus allowing smooth transition. The adjustable resistor 61′ permits adjustment of the exact value of the crossover points.

While many modifications and changes may be made other than those shown and described, those being shown and described for the purpose of illustrating the invention, I desire to be limited in my invention only by the scope of the accompanying claims.

I claim:

1. In an electrical-mechanical converter system comprising, motive means for reversibly driving throughout 360 degrees, a potentiometer of a character providing for relative rotation between the resistance element and the tap thereof coupled to said motive means to provide relative drive between the tap and resistance element thereof, a negative voltage placed across said potentiometer, a positive signal voltage input, means coupled to said potentiometer tap and to said signal voltage input for summing said voltages, circuit means coupling the summed voltage across a load to said motive means, means responsive to a summed voltage of a predetermined positive amount for adding thereto a relatively larger negative voltage, and means responsive to a summed voltage of a predetermined negative amount for adding thereto a relatively larger positive voltage, whereby said summed voltage is limited in magnitude and changed in polarity within predetermined limits.

2. In an electrical-mechanical converter system as set forth in claim 1 wherein said control circuit means includes a clamping circuit and a vacuum tube amplifier for amplifying the summed voltage the amplified output of which is clamped in the positive and negative directions by said clamping circuit, and the vacuum tube output is impressed on said motive means at the output of said circuit means to said motive means.

3. In an electrical-mechanical converter system comprising; an electric motive means for reversibly driving an indicator and the movable tap of a rotatable potentiometer in either direction throughout 360 degrees, said potentiometer having a negative voltage across its terminals; a summing circuit; means including a first resistor for applying a signal voltage, the amplitude of which corresponds to direction in a 360 degree field to the input of said summing circuit, means including a second resistor for applying said potentiometer movable tap voltage to the input of said summing circuit; means responsive to voltage in said summing circuit in excess of a predetermined positive amount for adding thereto a relatively larger negative voltage and means responsive to voltage in said summing circuit in excess of a predetermined negative amount for adding thereto a relatively larger positive voltage, whereby said summed voltage is limited in magnitude and changed in polarity.

4. In an electrical-mechanical converter system as set forth in claim 3 wherein said control circuit includes a vacuum tube relay, a switch controllable by said relay to switch to selectively apply either a positive voltage or a negative voltage to said motive means in a manner to be added to said summed voltage whereby the motive means will rotate in correspondence with the resulting polarity.

5. In an electrical-mechanical converter system comprising; an indicator, a rotatable potentiometer having a movable tap, a reversible electric motive means having an output shaft, said shaft being operatively coupled to reversibly drive said indicator and the movable tap of said rotatable potentiometer, means for applying a negative potential across the terminals of said potentiometer; a summing circuit; means for applying a positive signal voltage, the amplitude of which corresponds to direction in a 360 degree field and the limits of which are of a magnitude coextensive with those of the potentiometer as an input to said summing circuit, means for coupling said potentiometer movable tap voltage to the input of said summing circuit; a circuit including a load resistor for coupling said summing circuit to said motive means; and a double triode tube having one grid thereof coupled to said summing circuit and the other grid thereof grounded, a double throw relay having a plurality of coils each anode being coupled through a respective coil of said double throw relay to an anode supply voltage, respective contacts of said double throw relay being coupled respectively to positive and negative voltage sources, and the common switch blade of said relay being coupled to said coupling circuit at the output of said load resistor whereby the summed voltage controls said relay to above and below predetermined positive and negative voltages to apply negative and positive voltages to said motive means to drive said motive means over the shorter rotative path to equalize the magnitude of the signal and potentiometer voltages.

6. In an electrical-mechanical converter system comprising; a rotatable potentiometer, an indicator, a reversible electric motive means having an output shaft said shaft being operatively coupled to reversibly drive said indicator and the movable tap of said rotatable potentiometer, a source of potential having a negative potential across the terminals of said potentiometer; a summing circuit; means for applying a positive signal voltage input, the amplitude of which signal corresponds to direction in a 360 degree field and the limits of which are of a magnitude coextensive with those of said potentiometer, means for coupling the potentiometer movable tap voltage to the input of said summing circuit; a coupling circuit connecting said summing circuit with said motive means and including a load resistor; and a control circuit including a triode amplifier tube and a voltage clamping circuit coupled to the anode of said tube for limiting the positive and negative voltage levels of said amplifier tube output, the grid of said tube being coupled to the output of said summing circuit and the anode of said tube being coupled through a second resistor to said coupling circuit at the output of said load resistor whereby the polarity of a voltage to said motive means is determined by said control circuit to drive said motive means over the shorter rotative path to bring the negative voltage of said potentiometer into coincidence in magnitude to the positive voltage of said signal input.

7. A control circuit for selectively producing limited amplitude positive and negative composite output voltage signals from a plurality of positive and negative voltage intelligence comprising; a first summing circuit for electrically summing a plurality of positive and negative voltages, a control network including a double triode having a conduction control circuit coupling the output of said first summing circuit to a first grid circuit of said triode, the second grid of which is grounded, auxiliary positive and negative voltage sources operatively connected with said control network, a second summing circuit coupled to said first summing circuit and said control network to provide a composite summed output of the voltage intelligence and the auxiliary voltages as controlled by said control network in response to the conduction of said triode to selectively produce positive and negative voltage signals at the composite summed output and wherein said control network includes a selectively switchable relay having a relay coil for each switchable position with one each triode anode output coupled through one each relay coil to a source of anode supply voltage with the switchable blade of said relay coupled to said second summing circuit and in switchable contact with said auxiliary positive and negative sources.

8. A control circuit for selectively producing limited amplitude positive and negative composite output voltage signals from a plurality of positive and negative voltage intelligence comprising; a first summing circuit for electrically summing a plurality of positive and negative voltages, a control network including a triode amplifier tube having a conduction control circuit coupling the output of said first summing circuit to the grid circuit of said amplifier tube, auxiliary positive and negative voltage sources operatively connected with said control network, a second summing circuit coupled to said first summing circuit and said control network to provide a composite summed output of the voltage intelligence and the auxiliary voltages as controlled by said control network in response to the conduction of said amplifier tube to selectively produce positive and negative voltage signals at the composite summed output, and wherein said control network includes a voltage clamping circuit coupled to the anode of said amplifier tube including a voltage clamping diode means for each positive and negative auxiliary voltage associated by direct coupling respectively with said diode means, said diode means being controlled in conduction selectively by said triode amplifier tube.

9. In an electrical mechanical converter system comprising; an electric motive means for reversibly driving an indicator and the movable tap of a rotatable potentiometer in either direction throughout 360 degrees, said potentiometer having a negative voltage across its terminals, a summing circuit; means including a first resistor for applying to said summing circuit a signal voltage the amplitude of which corresponds to direction in a 360 degree field, means responsive to voltage in said summing circuit less than a predetermined positive amount for adding thereto a relatively larger negative voltage and responsive to voltage in said summing circuit less than a predetermined negative amount for adding thereto a relatively larger positive voltage and means for applying the resultant voltage in said summing circuit to said motive means.

10. The apparatus as recited in claim 9 wherein said last-mentioned means comprises an amplifier, a clamping circuit for positive and negative voltages, the input to said amplifier being from the input to said third resistor, means including a fourth resistor for coupling the output of said amplifier to the output of said third resistor, the clamping circuit being coupled to the output of said amplifier to clamp the voltage output at predetermined positive and negative voltage levels, the polarity of the output to said motive means being the polarity of the predominating summed voltage through said third resistor and the amplified-clamped voltage through said fourth resistor.

References Cited in the file of this patent

UNITED STATES PATENTS

| | | |
|---|---|---|
| 2,401,779 | Swartzel | June 11, 1946 |
| 2,460,276 | Bernas | Feb. 1, 1949 |
| 2,773,414 | Green | Dec. 11, 1956 |
| 2,777,105 | Larsen | Jan. 8, 1957 |
| 2,801,296 | Blecher | July 30, 1957 |